UNITED STATES PATENT OFFICE.

MARIA A. STEVENS, OF WASECA, MINNESOTA.

COMPOSITION OF MATTER FOR COLORING FABRICS.

SPECIFICATION forming part of Letters Patent No. 562,045, dated June 16, 1896.

Application filed April 8, 1896. Serial No. 586,711. (No specimens.)

*To all whom it may concern:*

Be it known that I, MARIA A. STEVENS, a citizen of the United States, residing at Waseca, in the county of Waseca and State of Minnesota, have invented certain new and useful Improvements in Dyes or Composition of Matter for Coloring Fabrics, &c.; and I do declare the following to be a full, clear, and exact description of the invention, such as will enable others skilled in the art to which it appertains to make and use the same.

The primary object of my invention is to produce a simple, reliable, and remarkably effective coloring or dyeing solution for dyeing in a fast and solid color, or in any desirable combination of colors, textile fabrics and straw goods.

A further object is to utilize such a solution as will warrant the color or colors from running when the dyed goods are subjected to the washing, moistening, or sponging process; to fully retain the pliability of the goods and at the same time serve as an effective cleansing and renovating medium.

The main uses to which my dye, coloring solution, or composition of matter have been applied are the coloring of light, old, and faded millinery goods—such as ribbons, feathers, artificial flowers, laces, velvets, furs, felt, straw goods, &c.—which goods, after having been subjected to the coloring solution hereinafter described, are restored to practically their original luster, and may be employed for all uses to which the goods were originally applicable and for which they were intended, the only substantial difference being that the original color and the dead or faded appearance of the goods (whether the original existed in a plain color or combination of colors) is now changed into a new, live, fresh color or combination of colors and the goods have the general appearance of new, fresh goods, possessing all the luster, pliability, &c., of newly-manufactured articles.

My dyeing or coloring composition of matter consists of certain ingredients, combined in the proportions hereinafter stated, the following being the formula of about four (4) ounces of said dye or coloring-matter, viz: chloroform, one-half ($\frac{1}{2}$) ounce; benzin, one-half ($\frac{1}{2}$) ounce; gasolene, three and one-half ($3\frac{1}{2}$) ounces, and eighteen (18) grains of "Windsor and Newton's" tube oil paints of any desired color or combination of colors.

In carrying out my process I add the chloroform to the "Windsor and Newton's" paint or other suitable paint and mix thoroughly. I then add the benzin and mix again, and finally add that quality of burning fluid known in the trade as "gasolene."

The paints hereinbefore referred to are ordinary mercantile mineral paints, and are well known in the trade.

It will be readily perceived that the color of any article or the goods, such as those aforesaid, are readily and effectually changed from one shade or tint to another, or by intermingling various tints or colors of the aforesaid paints in combination with the chloroform, benzin, and gasolene any desired colors or shades of colors may be produced.

The individual qualities and characteristics of each of the ingredients herein named being generally known, it is not deemed necessary to further elaborate thereon, as it will be quite obvious to any one skilled in the art that the aforesaid ingredients act conjointly in producing a solution or composition of matter for the coloring and dyeing of fabrics, &c., which combine to avoid tedious delays, which often occur in allowing the colors to properly set. The delays in drying out after coloring serve to fasten the colors securely in the goods, retain their original pliability, cleanse, renovate, &c.

I am aware that a solution consisting of gasolene and mineral paints has been used for dyeing fabrics, &c., also that benzin and mineral paints have been used together for the purpose named; but I am not aware of the use for dyeing purposes of chloroform in connection with benzin and gasolene combined with mineral paints, such as hereinbefore referred to.

What I claim, and desire to secure by Letters Patent of the United States, is—

The herein-described dye-matter or coloring composition of matter, consisting of chloroform, benzin, gasolene and mineral paint of any desired color, shade or combination of colors, in about the proportions stated.

In testimony whereof I affix my signature in presence of two witnesses.

MARIA A. STEVENS.

Witnesses:
JOHN T. HERB,
JOHN MOONAN.